US009675056B2

(12) United States Patent
Senter (10) Patent No.: US 9,675,056 B2
(45) Date of Patent: Jun. 13, 2017

(54) ILLUMINATED POLYMER LENTICULAR FISHING LURES

(71) Applicant: Robert Senter, Castle Rock, CO (US)

(72) Inventor: Robert Senter, Castle Rock, CO (US)

(73) Assignee: Robert Senter, Castle Rock, CO (US)

( * ) Notice: Subject to any disclaimer, the term of this patent is extended or adjusted under 35 U.S.C. 154(b) by 0 days.

(21) Appl. No.: 14/602,529

(22) Filed: Jan. 22, 2015

(65) Prior Publication Data

US 2015/0201592 A1     Jul. 23, 2015

Related U.S. Application Data

(60) Provisional application No. 61/930,203, filed on Jan. 22, 2014.

(51) Int. Cl.
*A01K 85/01*     (2006.01)
*A01K 85/00*     (2006.01)

(52) U.S. Cl.
CPC ............. *A01K 85/01* (2013.01); *A01K 85/00* (2013.01)

(58) Field of Classification Search
CPC ........ A01K 85/01; A01K 85/00; G09F 19/14; G03B 25/02
USPC ............ 43/17.6, 42.32, 42.33, 42.34; 40/454
See application file for complete search history.

(56) References Cited

U.S. PATENT DOCUMENTS

| 1,180,753 | A | * | 4/1916 | Zeigler | A01K 85/16 |
| | | | | | 43/42.32 |
| 2,002,135 | A | * | 5/1935 | Barton | A01K 85/01 |
| | | | | | 43/17.6 |
| 2,116,994 | A | * | 5/1938 | Bear | A01K 85/16 |
| | | | | | 43/42.33 |
| 2,188,753 | A | * | 1/1940 | Jennings | A01K 85/00 |
| | | | | | 43/42.32 |
| 2,241,941 | A | * | 5/1941 | Bates | A01K 85/16 |
| | | | | | 43/42.33 |

(Continued)

FOREIGN PATENT DOCUMENTS

| DE | 19907323 A1 | * | 8/2000 | ............. A01K 85/00 |
| EP | 0947133 A1 | * | 10/1999 | ............. A01K 85/16 |

(Continued)

OTHER PUBLICATIONS

"Lenticular Printing." Wikipedia. http://en.wikipedia.org/wiki/Lenticular_printing.

(Continued)

*Primary Examiner* — Darren W Ark
(74) *Attorney, Agent, or Firm* — Setter Roche LLP (57) ABSTRACT

Spoon, swimbait, jig and hard bodied fishing lures fishing equipped with one or more light sources interacting and/or interfacing with one or more polymer light transmission mediums are described herein. The light source optically coupled to the polymer light transmission medium acts to illuminate one or more areas of the fishing lure to provide and maintain its color, color pattern, iridescence, and flash. The combination of the lenticular lens placed with the flat back translucent surface to the polymer light transmission medium on or adjacent to the polymer light transmission medium to mimic the exact appearance of the bait fish while giving the lure a motion effect and a two or three dimensional appearance not attainable by any other lure technology known today.

15 Claims, 10 Drawing Sheets

(56) References Cited

U.S. PATENT DOCUMENTS

| | | | | |
|---|---|---|---|---|
| 2,335,322 A * | 11/1943 | Taylor | A01K 85/01 | 43/17.6 |
| 2,338,577 A * | 1/1944 | Divine | A01K 85/16 | 43/42.34 |
| 2,566,612 A * | 9/1951 | Hearne | A01K 75/04 | 43/42.34 |
| 2,599,035 A * | 6/1952 | Wing | A01K 85/16 | 43/42.33 |
| 2,754,610 A * | 7/1956 | Carlson | A01K 85/01 | 43/17.6 |
| 2,904,922 A * | 9/1959 | Orebaugh | A01K 85/14 | 43/42.32 |
| 2,915,843 A * | 12/1959 | Pabst | G09F 19/12 | 40/454 |
| 2,933,847 A * | 4/1960 | Frasure | A01K 85/00 | 43/42.33 |
| 3,122,853 A * | 3/1964 | Koonz | A01K 85/14 | 43/42.33 |
| 3,257,751 A * | 6/1966 | Benttinen | A01K 85/16 | 43/42.33 |
| 3,360,882 A * | 1/1968 | Belokin, Jr. | A01K 85/16 | 43/42.33 |
| 3,423,865 A * | 1/1969 | Hardesty | G09F 13/06 | 40/454 |
| 3,528,189 A * | 9/1970 | Lilley, Jr. | A01K 85/16 | 43/42.33 |
| 3,621,600 A * | 11/1971 | Dworski | A01K 85/01 | 43/17.6 |
| 3,631,625 A * | 1/1972 | Castner | A01K 85/16 | 43/42.33 |
| 3,828,177 A * | 8/1974 | Day | A01K 85/01 | 43/17.6 |
| 3,879,883 A * | 4/1975 | Strader | A01K 85/16 | 43/42.32 |
| 4,067,129 A * | 1/1978 | Abramson | G09F 19/12 | 40/454 |
| 4,250,650 A * | 2/1981 | Fima | A01K 85/01 | 43/17.6 |
| 4,347,681 A * | 9/1982 | Fima | A01K 85/01 | 43/17.6 |
| 4,638,584 A * | 1/1987 | Lindsay | A01K 85/01 | 43/17.6 |
| 4,700,504 A * | 10/1987 | Mattison | A01K 85/16 | 43/17.6 |
| 4,751,788 A * | 6/1988 | Mattison | A01K 85/01 | 43/17.6 |
| 4,757,631 A * | 7/1988 | Anson-Smith | A01K 79/02 | 43/17.5 |
| 4,766,684 A * | 8/1988 | Wah Lo | G09F 19/14 | 40/454 |
| 4,803,793 A * | 2/1989 | Schellenberg, III | A01K 85/16 | 43/42.33 |
| 4,831,765 A * | 5/1989 | Bradshaw | A01K 85/14 | 43/17.6 |
| 4,862,631 A * | 9/1989 | Wilson | A01K 85/16 | 43/42.33 |
| 4,870,768 A * | 10/1989 | Watt | G09F 19/14 | 40/454 |
| 4,888,905 A * | 12/1989 | Garr | A01K 85/01 | 43/17.6 |
| 4,922,646 A * | 5/1990 | Basgal | A01K 85/00 | 43/42.33 |
| 5,076,003 A * | 12/1991 | Chen | A01K 85/01 | 43/42.33 |
| 5,146,703 A * | 9/1992 | Boden | G09F 19/14 | 40/454 |
| 5,201,784 A * | 4/1993 | McWilliams | A01K 85/01 | 43/42.31 |
| 5,237,766 A * | 8/1993 | Mikolay | G09F 13/0409 | 40/454 |
| 5,566,494 A * | 10/1996 | Zimmer | A01K 85/16 | 43/17.6 |
| 5,695,346 A * | 12/1997 | Sekiguchi | G02B 27/2214 | 40/453 |
| 5,737,867 A * | 4/1998 | Tsutsumi | A01K 85/16 | 43/17.6 |
| 6,029,388 A * | 2/2000 | Yokogawa | A01K 85/01 | 43/17.6 |
| 6,192,617 B1 * | 2/2001 | Lyles | A01K 85/01 | 43/17.6 |
| 6,202,337 B1 * | 3/2001 | Yoshida | A01K 85/16 | 43/42.33 |
| 6,226,906 B1 * | 5/2001 | Bar-Yona | G09F 9/30 | 40/454 |
| 6,318,016 B1 * | 11/2001 | Ellig | A01K 85/01 | 43/17.6 |
| 6,357,153 B1 * | 3/2002 | Gelardi | G03B 25/02 | 40/454 |
| 6,618,972 B2 * | 9/2003 | Bar-Yona | G07F 9/02 | 40/454 |
| 6,748,684 B1 * | 6/2004 | Bar-Yona | G09F 19/14 | 40/454 |
| 6,807,766 B1 * | 10/2004 | Hughes | A61F 5/48 | 43/17.6 |
| 6,850,209 B2 * | 2/2005 | Mankins | B60Q 1/2611 | 40/590 |
| 6,922,935 B2 * | 8/2005 | Yu | A01K 85/01 | 43/17.6 |
| 6,989,931 B2 * | 1/2006 | Rosenthal | B29D 11/00288 | 359/619 |
| 7,234,257 B2 * | 6/2007 | Bar-Yona | G09F 19/12 | 40/454 |
| 7,263,797 B1 * | 9/2007 | Trillo | A01K 85/01 | 43/17.6 |
| 7,562,489 B2 * | 7/2009 | Turner | A01K 85/12 | 43/17.6 |
| 7,744,235 B2 * | 6/2010 | Horikoshi | G02B 3/005 | 362/337 |
| 7,752,801 B2 * | 7/2010 | Choi | A01K 85/01 | 43/42.34 |
| 7,788,834 B2 * | 9/2010 | Welch | A41D 27/085 | 40/454 |
| 7,971,377 B2 * | 7/2011 | Zheng | G02B 27/2214 | 40/454 |
| 8,021,732 B2 * | 9/2011 | Hegemier | A01K 85/01 | 428/40.1 |
| 8,091,270 B2 * | 1/2012 | Senter | A01K 85/00 | 43/17.6 |
| 8,240,078 B2 * | 8/2012 | Hawryshyn | A01K 85/01 | 43/17.6 |
| 8,402,688 B2 * | 3/2013 | Choi | A01K 85/01 | 43/42.34 |
| 8,490,321 B1 * | 7/2013 | Butz | A01K 85/01 | 43/17.6 |
| 8,533,990 B2 * | 9/2013 | Aanenson | A01K 85/00 | 43/17.6 |
| 8,567,109 B1 * | 10/2013 | Grigorovich | A01K 85/01 | 43/17.6 |
| 8,605,359 B2 * | 12/2013 | Spiro | G02B 3/005 | 40/454 |
| 8,659,831 B2 * | 2/2014 | Yoon | G03B 35/24 | 40/454 |
| 8,745,915 B2 * | 6/2014 | McManigal | A01K 85/01 | 43/17.6 |
| 8,931,205 B2 * | 1/2015 | Choi | A01K 85/01 | 43/42.34 |
| 9,007,691 B2 * | 4/2015 | Yumoto | G02B 27/2214 | 359/455 |
| 9,082,326 B2 * | 7/2015 | Aho | G09F 13/02 | |
| 9,282,730 B2 * | 3/2016 | Senter | A01K 85/01 | |
| 2003/0154642 A1 * | 8/2003 | Johnston | A01K 85/16 | 43/42.33 |
| 2003/0182840 A1 * | 10/2003 | Colley | A01M 31/06 | 43/3 |
| 2003/0192226 A1 * | 10/2003 | Cain | C07D 471/08 | 43/3 |
| 2004/0035031 A1 * | 2/2004 | Pinter | G09F 13/22 | 40/454 |

(56) References Cited

U.S. PATENT DOCUMENTS

| | | | | |
|---|---|---|---|---|
| 2004/0093778 | A1* | 5/2004 | Asvadi | G09F 13/22 40/544 |
| 2004/0244265 | A1* | 12/2004 | Miyata | A01K 85/01 43/17.6 |
| 2005/0172533 | A1* | 8/2005 | Fu | A01K 85/01 43/17.6 |
| 2007/0113440 | A1* | 5/2007 | Asvadi | G09F 13/22 40/544 |
| 2007/0144047 | A1* | 6/2007 | Singh | A44C 5/0015 40/633 |
| 2008/0104880 | A1* | 5/2008 | Hegemier | A01K 85/01 43/42.32 |
| 2009/0056181 | A1* | 3/2009 | Meyer | G03B 25/02 40/454 |
| 2011/0286092 | A1* | 11/2011 | Chung | G02B 3/0056 359/463 |
| 2011/0308120 | A1* | 12/2011 | Heo | G09F 9/33 40/541 |
| 2012/0096756 | A1* | 4/2012 | Senter | A01K 85/00 43/17.6 |
| 2013/0049609 | A1* | 2/2013 | Browder | G09F 27/007 362/183 |
| 2013/0088853 | A1* | 4/2013 | Kingsley | H01L 27/322 362/84 |
| 2013/0125446 | A1* | 5/2013 | Senter | A01K 85/10 43/17.6 |
| 2013/0258709 | A1* | 10/2013 | Thompson | G02B 6/0025 362/608 |
| 2015/0279253 | A1* | 10/2015 | Aho | G09F 13/02 40/454 |

FOREIGN PATENT DOCUMENTS

| | | | | |
|---|---|---|---|---|
| GB | 2470559 A | * | 12/2010 | A01K 85/10 |
| JP | 10127210 A | * | 5/1998 | |
| JP | 2000157107 A | * | 6/2000 | |
| JP | 2000189004 A | * | 7/2000 | |
| JP | 2002199828 A | * | 7/2002 | |
| JP | 2005130842 A | * | 5/2005 | |
| JP | 2010200736 A | * | 9/2010 | |
| JP | 2010263876 A | * | 11/2010 | |
| JP | 2011147372 A | * | 8/2011 | |
| JP | 2012075407 A | * | 4/2012 | |
| WO | WO 03071864 A2 | * | 9/2003 | A01K 85/16 |
| WO | WO 03071864 A3 | * | 12/2003 | A01K 85/16 |

OTHER PUBLICATIONS

"Lenticular Lens." Wikipedia. http://en.wikipedia.org/wiki/Lenticular_lens.

* cited by examiner

ILLUMINATED POLYMER LENTICULAR FISHING LURES

RELATED APPLICATIONS

This application is related to and claims priority to U.S. Provisional Patent Application 61/930,203, titled "ILLUMINATED SPOON FISHING LURE," filed on Jan. 22, 2014, and which is hereby incorporated by reference in its entirety.

TECHNICAL FIELD

Aspects of the disclosure relate generally to fishing equipment and more particularly to providing and maintaining the color, color pattern, iridescence, flash, a motion effect, and two or three dimensional appearance to spoon, swimbait, jig, and hard bodied fishing lures.

TECHNICAL BACKGROUND

Salt water and fresh water fishing lures adapted to ensnare fish or other prey are known in the art. Spoon fishing lures comprised of casting spoons, jigging spoons, trolling spoons and topwater spoons are simple in design, made from metal in an oblong shape, concave on one side that catches water producing a wobble and having a sunlight reflecting flash to imitate a fleeing or injured bait fish. Spoon lures appeal mainly to the sense of sight and work best in clear or lightly stained water conditions.

OVERVIEW

Aspects of the present disclosure relate to spoon, jig, swimbait, and hard bodied fishing lures equipped with one or more light sources that interact and/or interface with one or more polymer light transmission mediums and one or more lenticular lenses. The light source can be embedded in or located proximate to the polymer light transmission medium to amplify, intensify, and/or disperse light in a diffused manner along the polymer light transmission medium. The lenticular lens has a front surface and a flat back translucent surface that when positioned adjacent or directly to the polymer light transmission medium will maintain the color, color pattern, iridescence, flash, a motion effect and two or three dimensional appearance to the spoon, swimbait, jig, or hard bodied lure.

In one aspect of the invention, a traditional casting spoon lure; concave and oblong in shape and having a distinctive back-and-forth wobble when retrieved, includes a hook, a polymer light transmission medium oblong body; a lenticular lens attached at the flat back translucent surface to the polymer light transmission medium oblong body, a light source optically coupled with the polymer light transmitting spoon body and a power source electrically coupled with the light source.

In another aspect of the invention a swimbait lure, which imitates the appearance of a bait fish and generates a lure action appearing to swim as the tail flutters during retrieve, includes a hook, a polymer light transmission medium swimbait lure body, a lenticular lens attached at the flat back translucent surface to the polymer light transmission medium swimbait lure body, a light source optically coupled with the polymer light transmitting medium swimbait lure body and a power source electrically coupled with the light source.

In another aspect of the invention a jig lure, intended to be fished with a jerky vertical motion, includes a hook, a polymer light transmission medium jig body, a lenticular lens attached at the flat back translucent surface to the polymer light transmission medium jig body, a light source optically coupled with the polymer light transmitting jig body and a power source electrically coupled with the light source.

In yet another aspect of the invention a hard bodied lure also known as a crankbait, includes two hooks, a polymer light transmission medium body placed inside the hard bodied lure, or on the outside of the hard bodied lure body, a light source optically coupled with the polymer light transmitting medium crankbait lure body and a power source electrically coupled with the light source.

The features, utilities, and advantages of the various embodiments of the present invention will be apparent from the following more particular descriptions of the embodiments of the invention as illustrated in the accompanying drawings and defined in the appended claims.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Embodiments described herein relate to an illumination system for providing and maintaining the color, color pattern, iridescence, flash, a motion effect and two or three dimensional appearance to spoon, swimbait, jig and hard bodied fishing lures combining the lenticular lens attached at the flat back translucent surface to a polymer light transmission medium. The polymer light transmission medium can be molded to form a specific design, size, shape, and desired weight to a spoon, swimbait, jig and hard bodied fishing lure. Colorants, florescent or reflective particles and other materials can be added to the polymer light transmission medium to enhance its appearance. Additionally, during the injection molding process a fish scale and fin pattern 121 (illustrated in FIG. 2) can be cut into the polymer light transmission medium creating a luminescence around each fish scale and fin pattern.

The light source can be embedded in or located proximate to the polymer light transmission medium such that light from the light source is amplified, intensified, and dispersed in a diffused multidirectional manner along the polymer light transmission medium to provide and maintain a color, color pattern, flash, and luminescence to the spoon, swimbait, jig and hard bodied fishing lure. A power source, such as a battery, can be used to power the light source.

Spoon, swimbaits, jigs and hard bodied lures change dramatically underwater because water is 784 times denser than air and acts as a selective color filter causing loss of sunlight adversely affecting color, contrast, iridescence, and flash. The way light transforms under water is responsible for the typical "under water atmosphere" creating challenges for the angler with visual lure performance. Spoon, swimbait, jig and hard bodied fishing lures attract fish or other aquatic animals by motion, sound, vibration, and visual appearance. Motion, sound and vibrations can be altered by the size, shape and weight of the spoon, swimbait, jig and hard bodied fishing lure, water currents and the angler's ability to retrieve the lure. What the angler cannot influence is the visual appearance of the fishing lure once it enters the water. It is a known fact that as light passes through water it is absorbed and much of it lost in the process. This light absorption occurrence cause spoon, swimbait, jig and hard bodied fishing lures to lose their surface appearance as they go deeper down or further away as wavelengths that make up our perception of color are absorbed differently underwater.

Fish see in color and use sight almost 100 percent in their selection of food as sight is by far their dominant sense. It is to be appreciated that maintaining the color, color pattern, iridescence, flash, a depth of motion and two or three dimensional appearance to spoon, swimbait, jig and hard bodied fishing lures at any depth fished, during loss of sunlight, in degrading water clarity, unfavorable weather conditions, and at dusk, dawn or night will catch more fish as the visual lure performance of other lures are diminished or completely lost under these adverse conditions.

The polymer light transmission medium must have an acceptable refractive index in the range of 125 to above 150 depending on the polymer light transmission medium used to properly amplify the light source in a diffused multidirectional manner to provide and maintain the color, color pattern iridescence, and flash to the spoon, swimbait, jig and hard bodied fishing lure. In optics the refractive index or index of refraction n of a substance or medium is a measure of the speed of light that propagates through that medium. It is defined as:

$$n = \frac{c}{v},$$

where c is the speed of light in a vacuum and v is the speed of light in the substance.

The polymer light transmission medium has a specific gravity which is the ratio of the density (mass of a unit volume) of a substance to the density (mass of the same unit volume) of a reference substance which is usually distilled water at 1.0 kg/dm$^3$. The density of the polymer light transmission medium can range below or above 1.0 kg/dm$^3$ allowing the spoon, swimbait, jig and hard bodied fishing lure to reach neutral buoyancy at specific water depths.

The light emitting diode (LED) coupled with the polymer light transmitting medium can produce any visible light colors as well as Ultra Violet rated at a wavelength of 400 nanometers and infrared (IR) rated at a wavelength of 940 nanometers. The amount of light emitted from an LED is quantified by a single point, on-axis luminous intensity value (Iv) and its intensity is specified in terms of a millicandela rating (mcd) which can range from under 100 mcd to over 8,000 mcd depending on the illumination desired. When optically coupling the LED with the polymer light transmitting medium the luminous intensity which is affected by the amount of current passing through the LED and its viewing angle which can range from 20 degrees to 45 degrees must be considered to generate an acceptable color, color pattern, iridescence, and flash to the spoon, swimbait, jig and hard bodied fishing lure.

It must be appreciated that very limited polymers have the ability to transmit light in a diffused multidirectional manner. UNISOFT TPE™ ST-50A-CL-1-01, a thermoplastic elastomer compound based on a Styrene-Ethylene/Butylene-Styrene Block Copolymer is acceptable as well as other types of polyolefins, polypropylenes, ethylene vinyl acetates, and clear aliphatic thermoplastic polyurethanes. Once the polymer is chosen specific additives to eliminate discoloration from ultraviolet light interaction like Chase Plastic's GPCX-900 may be added at a weight ratio of 2 percent or greater without adversely affecting translucency or the ability to transmit and diffuse light. This polymer compound is further limited as it must have a tensile strength between 1,400 psi to over 9,000 psi to keep from tearing or degrading when stress is created from a fish strike or interaction. The polymer light transmission medium must also have an acceptable specific gravity insuring a desirable sink rate as spoon fishing lures are generally made of metal like brass, copper or nickel and are fished at varying water depths. The sink rates of metal spoon lures are determined by size, shape and most importantly weight of the lure. Slowing down the sink rate can increase the ability of the fish to strike the lure. Mixing different percentages of polymer light transmission mediums having varying specific gravities overcomes the deficiencies of metal spoon lures allowing for larger sized polymer light transmission medium spoon lures to have a slower sink rate not attainable or equivalent to metal spoon lures.

Melt temperatures of these compounded copolymer light transmission mediums having different specific gravities must be considered as the preferred method of manufacturing is injection molding requiring specific temperatures and pressures to be reached. Once the polymer light transmission medium is selected adding colorant like Clariant OMNICOLOR™ Edge Glow UV Yellow, #CC10142538WE, at a specific percentage by weight of 1 percent or greater must be determined so during the injection molding process a translucent uniform color is maintained. A reflective like American Glitter's, Alunex epoxy coated aluminum materials, 1027 AL Silver when added at 1 percent or greater by weight to the polymer light transmission medium must be able to maintain its reflective properties during the injection molding process which can require temperatures exceeding 320 degrees Fahrenheit. Exceeding reflective temperature specifications can causes a bleeding effect or loosing colors off the reflective which infiltrate into the polymer light transmission medium causing discoloration and loss of translucency.

The intention of this invention is not to attract fish to strike by use of an LED placed in a translucent material where the LED or light source is observed. Quite the opposite as it is the spirit of this invention to combine the lenticular lens placed at the flat back translucent surface to a polymer light transmission medium to provide and maintain the color, color pattern, flash, iridescence, a motion effect and a two or three dimensional appearance to spoon, swimbait, jig, and hard bodied fishing lures without observing the light source.

Iridescence to the spoon, swimbait, jig and hard bodied fishing lures can also be created by cutting a fish scale or fin pattern into the QC-10® aluminum injection mold or acceptable mold material at a depth of 0.0010" or greater depending on the luminescence desired. Once the polymer light transmission medium has been injected molded a luminescence or iridescence is created around each cut not attainable by luminescent paints or laser cuts into metal lures.

Glow in the dark paint containing phosphorus or doped strontium aluminate and charged by exposure to ultraviolet light is commonly used on fishing lures as is ultraviolet paint to attract fish. See U.S. Pat. No. 8,490,321, UV Reflective Fishing Lure System, Scott Butz, Jul. 3, 2013; "A UV reflective fishing lure system for consistently illuminating underwater for prolonged periods and at multiple depths to attract various fish species." Although moderately successful limitations exist in available colors, permanence and charge run time. Due to loss of sunlight, degrading water clarity or unfavorable weather conditions the visual lure performance of painted spoon, swimbaits, jigs and hard bodied fishing lures utilizing iridescent paints or UV compounds will be diminished or completely lost underwater while the lenticular lens placed at the flat back translucent surface to the polymer light transmission medium will provide and maintain the color, color pattern, flash iridescence, a motion effect and two or three dimensional appearance to the spoon, swimbait, jig and hard bodied fishing lure for as long as the battery remains charged or is replaced with another battery.

The lenticular lens refracts light outwardly when placed at the flat back translucent surface to the polymer light transmission medium. It does not rely on frontal refraction from sunlight or an external light source to be able to view the interlaced image from the front or sides of the lure body. It is a known fact that sunlight is absorbed underwater and the amount of visible light diminishes as an object falls deeper and further away. As referenced in US patent application number, PCT/US2003/002749, Motion Activated Fishing Lures, Brandon Johnston, filed Jan. 31, 2003, "An image changing fishing lure (10) uses lenticular or similar process of printed images (16) as a core of a fishing lure (10) to give a sense of movement or change in the image (16)." The use of a lenticular lens in this context will be unsuccessful as will the same application with Mylar strips, reflective foils, hologram reflective materials, holographic fishing tape or reflective paint as all are adversely affected by water depth fished, degrading water clarity, unfavorable weather conditions and lack of sunlight once the lure enters the water. During dawn, dusk or night the use of these materials placed on or inside the fishing lure will fail to perform as dependence on reflection from sunlight is nonexistent. This is further reinforced in U.S. Pat. No. 4,831,765, Fishing Lure or Decoy Device Including Holographic Image, Roy Bradshaw, issued May 23, 1989, Bradshaw reinforces the affects of light abortion under water when he adds an external light source to his holographic lure in order to enhance the appearance of the holographic image when applied to the lure body; "To further enhance the life-like appearance of the holographic image 36 on the fishing lure 28, an external light source 38 is preferably suspended upon the fishing line 34 while being directed generally toward the holographic image 36 to even further enhance its life-like appearance and make the lure even more attractive to the fish in their natural underwater environment." In order to compensate for absorption of light underwater Bradshaw realizes to affectively enhance his "life-like holographic image" similar to a lenticular lens and Mylar strips the utilization of an external light source is required. The addition of the lenticular lens placed at the flat back translucent surface to a polymer light transmission medium once activated will overcome these deficiencies and deliver the desired interlaced image underwater to the spoon, swimbait, jig, and hard bodied fishing lure equivalent to their surface counterpart, maintaining a color, color pattern, flash, iridescence, a motion effect and a two or three dimensional appearance like no other technology known today.

The ability to amplify, intensify, and/or disperse light along the polymer light transmission medium in a diffused multidirectional manner through the flat back surface of the lenticular lens allows the lenticular image to be viewed from the front surface and sides maintaining the integrity of the image projected while underwater. Without this combination of the lenticular lens and illuminated polymer light transmitting medium the desired appearance of a bait fish's color, color pattern, flash, iridescence, luminosity, a motion effect and two or three dimensional image with the spoon, swimbait, jig, and hard bodied lure could not be achieved. It should be emphasized that a primary characteristic of the illuminated polymer light transmission medium is its ability to diffuse light in a multidirectional manner through the entire polymer allowing the light source to have the same intensity so there are no hot spots or lack of illumination that would adversely affect a smooth and clear appearance to the interlaced image projected through the lenticular lens layers.

The chosen lenticular material used for the purpose of combining the lenticular lens attached at the flat back translucent surface to a polymer light transmission medium to enhance visual lure performance underwater is Azuna, made of a polypropylene based substrate. Using Azuna in a 75 LPI configuration gives better performance in cold and warm water where temperatures vary and greater clarity, flexibility and strength are required. Other material choices can be Acrylics, Polycarbonate, Polypropylene, Polyvinyl chloride and Styrene offered from 40 LPI up to 200 LPI or lines per inch.

Embodiments of the spoon, swimbait, jig, and hard bodied fishing lure can also include a compartment adapted to house the power source and some or all of the associated circuitry for the light source. In some embodiments, the light source can be activated or deactivated upon installation of the power source pushed directly into or pulled out from the compartment or by utilization of a switching devise.

FIGS. 1-4 shows one primary example of a spoon fishing lure 100, including the lenticular lens 120 molded onto the polymer light transmission medium lure body 122 and illumination system cradle 138 comprising light emitting diode (LED) 160, ball bearing 164, battery cell boot 112 and battery or power source 134. The polymer light transmission medium lure body 122 is designed to create a wobble and erratic action the angler can adjust depending on retrieve rate and water conditions. Forward reinforcing compression ring 106 located inside forward reinforcing ring eyelet 108 and rear reinforcing compression ring 124 located inside rear reinforcing compression ring eyelet 126 allows an opposing force to be applied between forward split ring 102 where fishing line is attached at forward split ring eyelet 104 and rear split ring 128 where the treble hook 132 is attached to rear split ring eyelet 130 via treble hook eyelet 174. Treble hook 132 could also be a single hook, a double hook, or any combination of fishing hooks.

Figure 5:
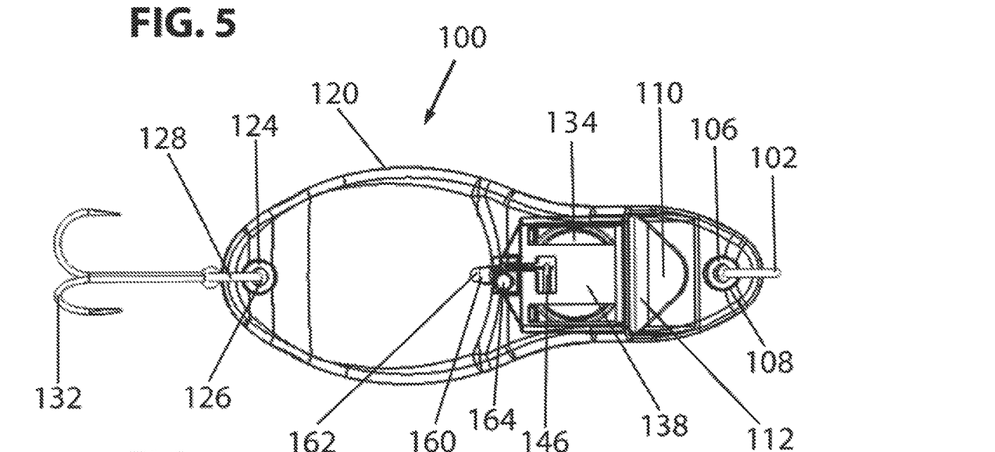
FIG. 5 is a transparent horizontal back view of the polymer light transmission spoon fishing lure shown in FIG. 2.
Figure 6:
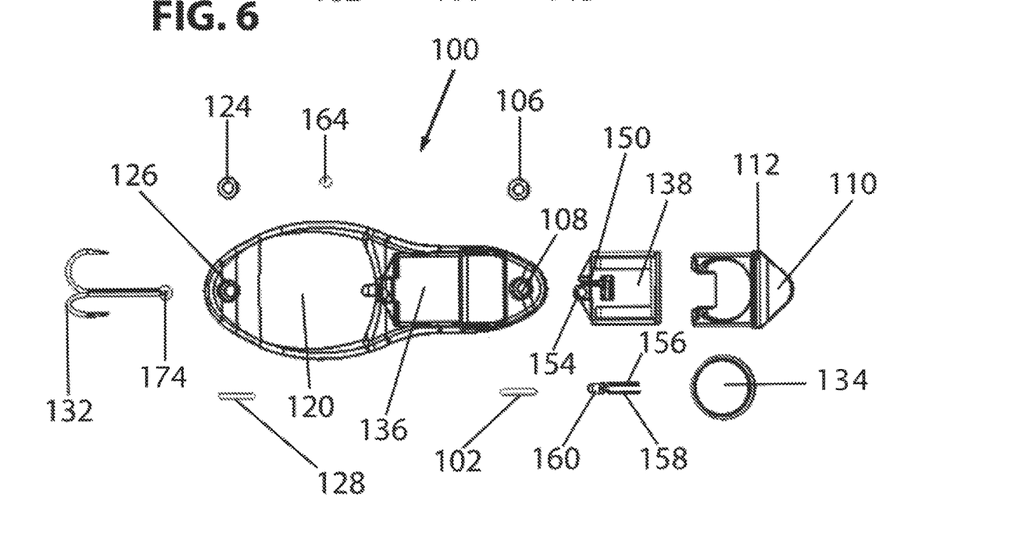
FIG. 6 is an exploded view of FIG. 5.
Figure 7:
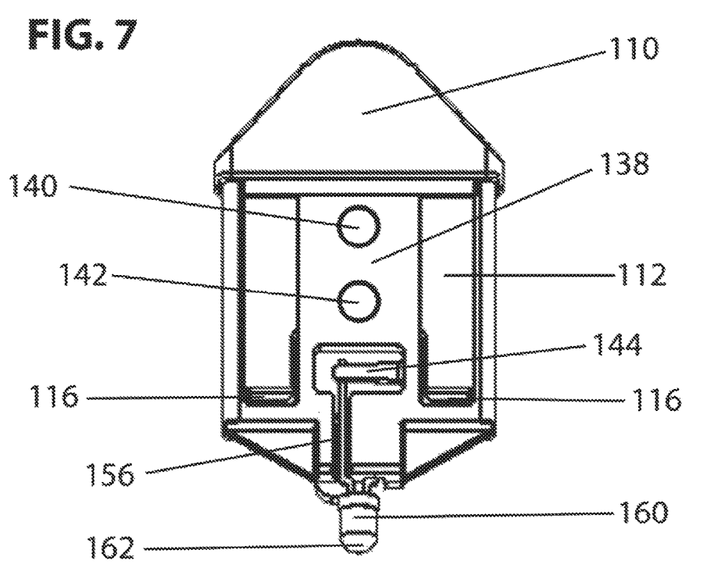
FIG. 7 is a vertical front view of the polymer light transmission spoon fishing lure illumination system cradle.
Figure 8:
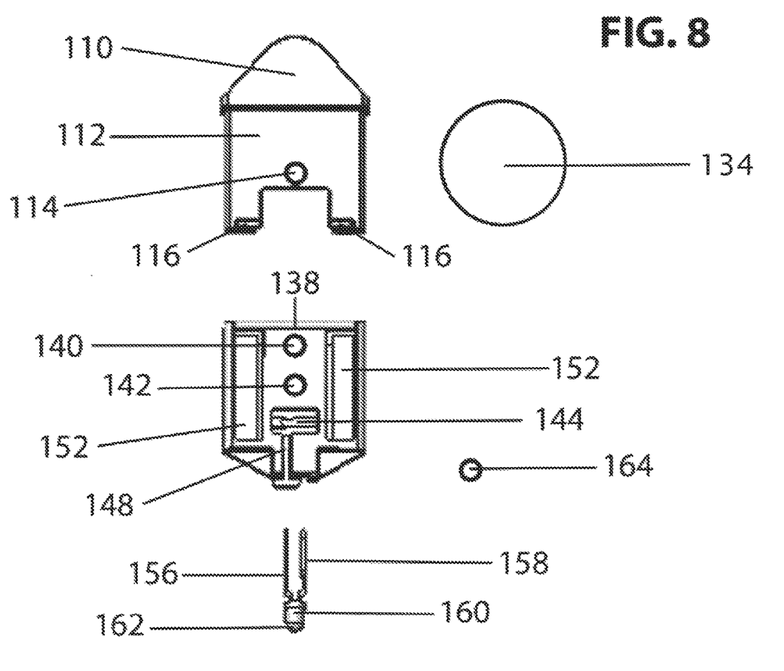
FIG. 8 is an exploded view of FIG. 7.
Figure 9:
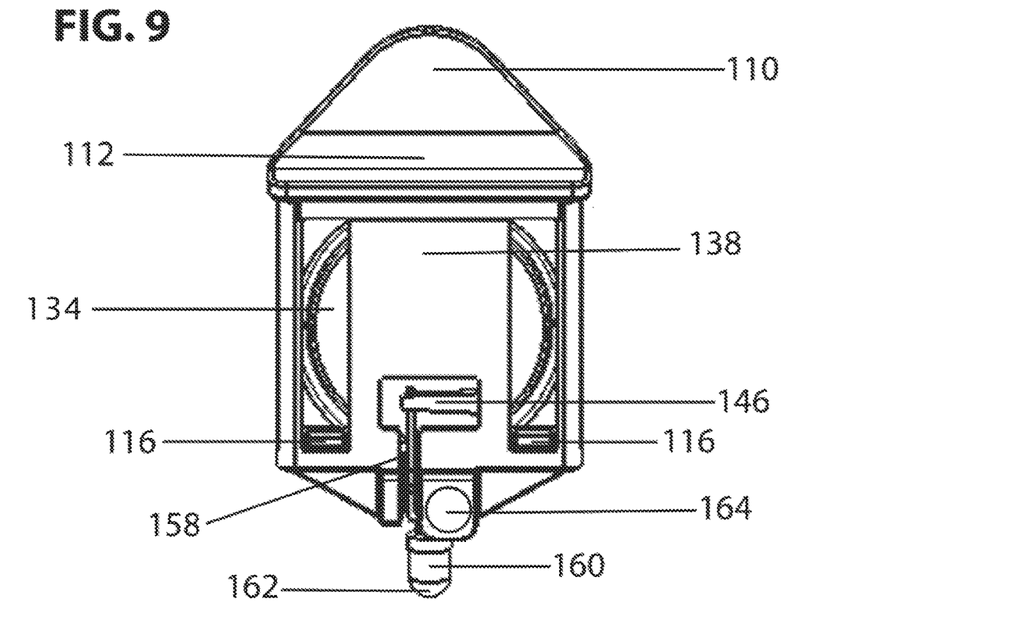
FIG. 9 is a vertical back view of the polymer light transmission spoon fishing lure illumination system cradle.
Figure 10:
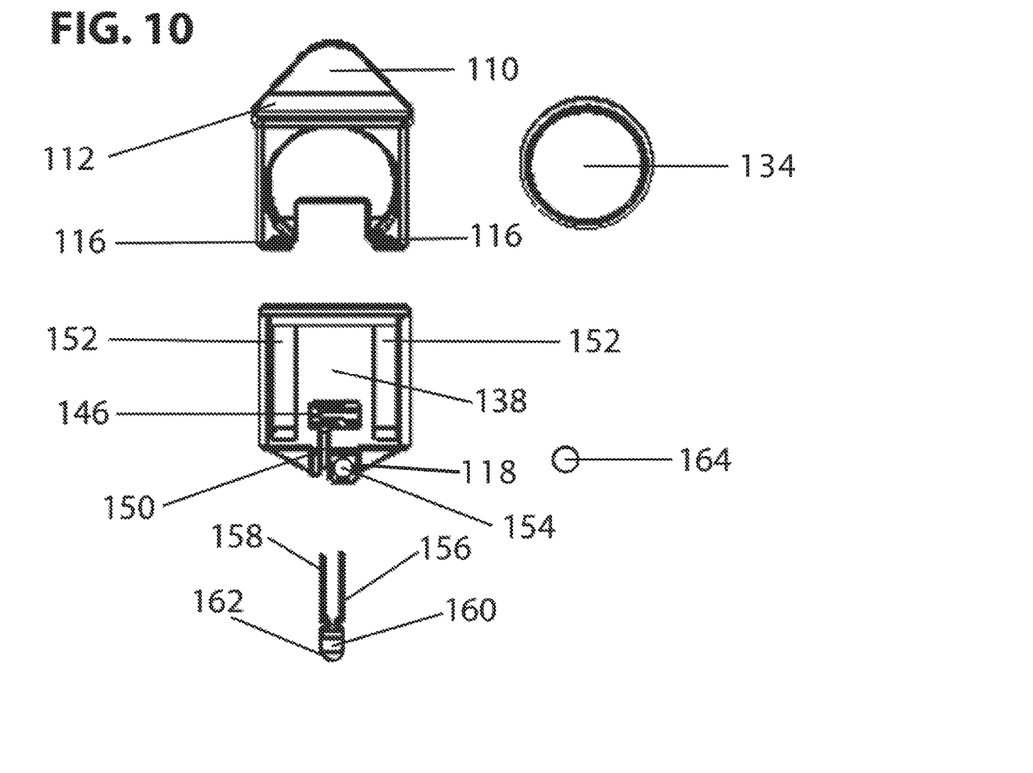
FIG. 10 is an exploded view of FIG. 9.

As shown in FIGS. 5-6 insertion of the illumination system cradle 138 into cradle channel 136 creates a water tight seal once battery cell boot 112 made from a flexible vulcanized rubber material such as Santoprene™, Versaflex™ or Dynaflex™ G2780-0001, a preferred thermoplastic elastomer, is pushed into place allowing battery 134 to be removed, replaced and or reversed easily due to the flexibility and the cell boot material shore hardness of A 85 using test method ASTM D2240. Pulling up battery cell boot tab 110 allows deactivation of LED 160, battery removal or battery reversal to store battery.

As shown in FIGS. 5-10, illumination system cradle 138 made from, plastic or acceptable materials is configured to allow insertion of LED 160 into its designed position. LED 160 with acrylic lens 162 has positive anode terminal pin 156 placed into insertion channel 148 secured under flexible terminal strut 144. LED negative cathode terminal pin 158 is placed into cathode terminal insertion channel 150 secured under flexible terminal strut 146. Each positive and negative terminal pin is bent and cut to a specific length and shape insuring correct assembly. Terminal struts 144 and 146 are designed to provide compression for terminal pins against battery or power source ensuring electrical conductivity and completion of the electrical circuit.

Figure 18:
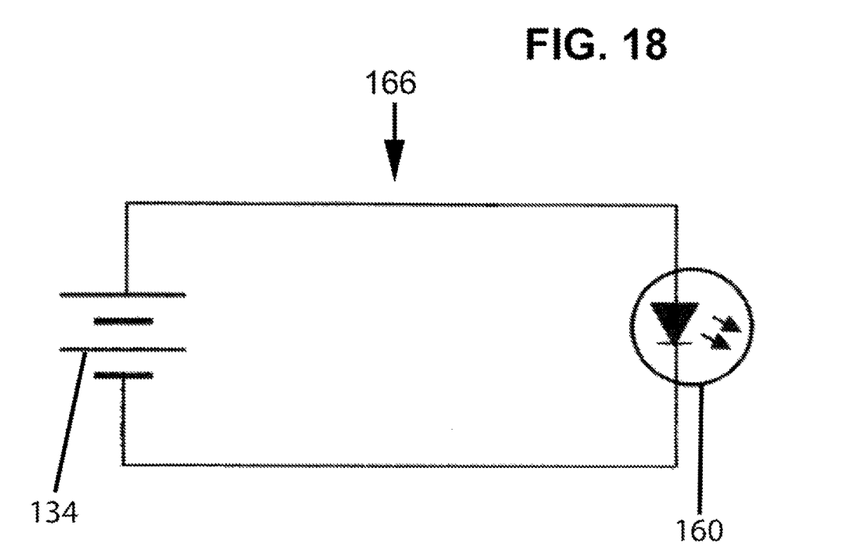
FIG. 18 is an electrical schematic diagram of a first circuit for an illumination system.
Figure 19:
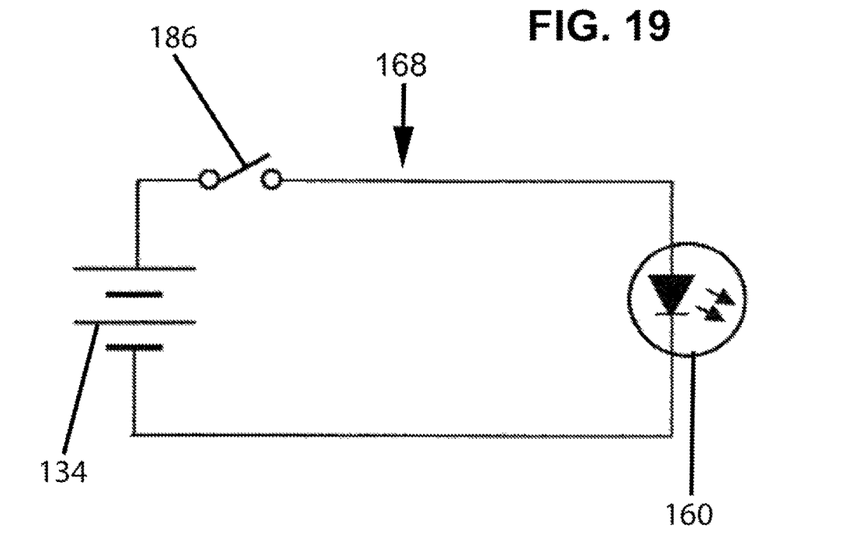
FIG. 19 is an electrical schematic diagram of a second circuit for an illumination system.

The illumination system circuit 166 shown in FIG. 18 may be implemented in spoon, swimbait, jig or hard bodied fishing lure 100. As such, LED 160 is activated once battery 134 is activated. As described above and with reference to other embodiments additional components can be included in the illumination system circuit 168, such as switch 186 shown in FIG. 19.

As further shown in front and back exploded views of illumination system cradle 138 in FIGS. 7-10, battery cell boot 112 designed to fit into cell boot channel 152 is guided into place by footing seals 116 and locks into activation position 142 or deactivation position 140 when cell boot tab 110 is pulled upward engaging battery cell boot retention guide 114 designed as a half round extrusion that pops into position 140 or 142. Pulling battery cell boot 112 up to deactivation position 140 allows front and back footing seals 116 to lock into place within cell boot channel 152 permitting battery 134 to be removed, replaced or reversed for deactivation and or storage.

It is to be appreciated that LED 160 and related components could be reversed from the above noted description and that various designs in spoon lure shapes, sizes and weights may be used with the various embodiments.

FIGS. 4-10 shows how illumination system cradle 138 slides into cradle channel 136 and is locked into position by pushing ball bearing 164 made of metal, rubber, plastic or acceptable material through ball bearing retention channel 118. Ball bearing 164 reaches its maximum recessed distance at ball bearing housing 154 where it stops and is locked into position creating a water tight seal within channel 136.

Figure 1:
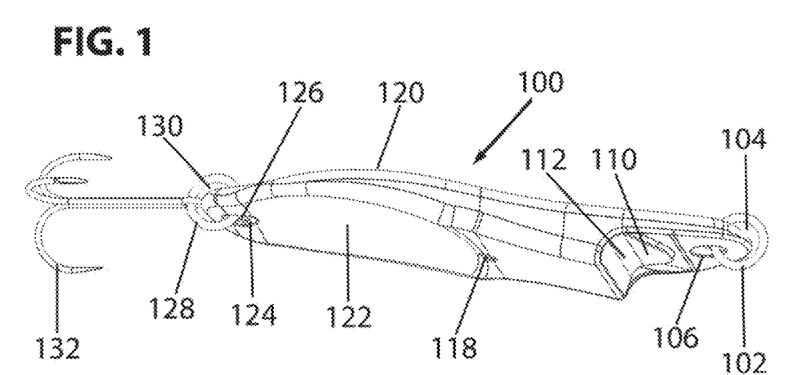
FIG. 1 is an isometric view of a first embodiment of a spoon fishing lure including a polymer light transmission spoon body, lenticular lens and illumination system.
Figure 2:
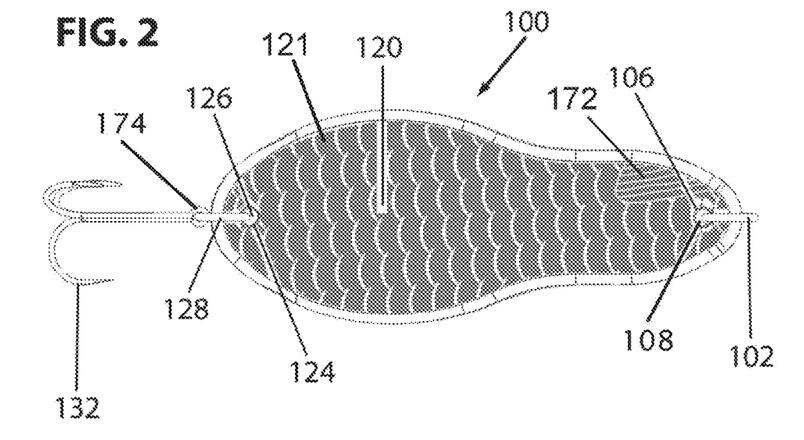
FIG. 2 is a top view of the spoon fishing lure shown in FIG. 1.
Figure 3:
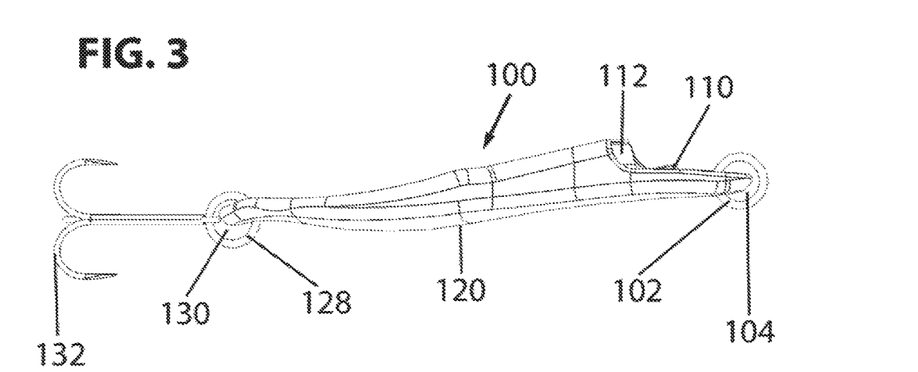
FIG. 3 is a side horizontal view of the spoon fishing lure depicted in FIG. 1.
Figure 4:
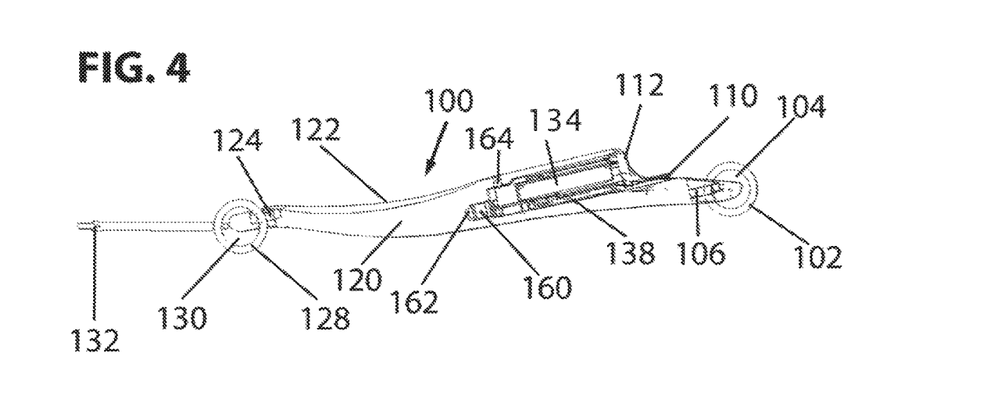
FIG. 4 is a side horizontal cross-sectional view of the fishing lure depicted in FIG. 3.
Figure 11:
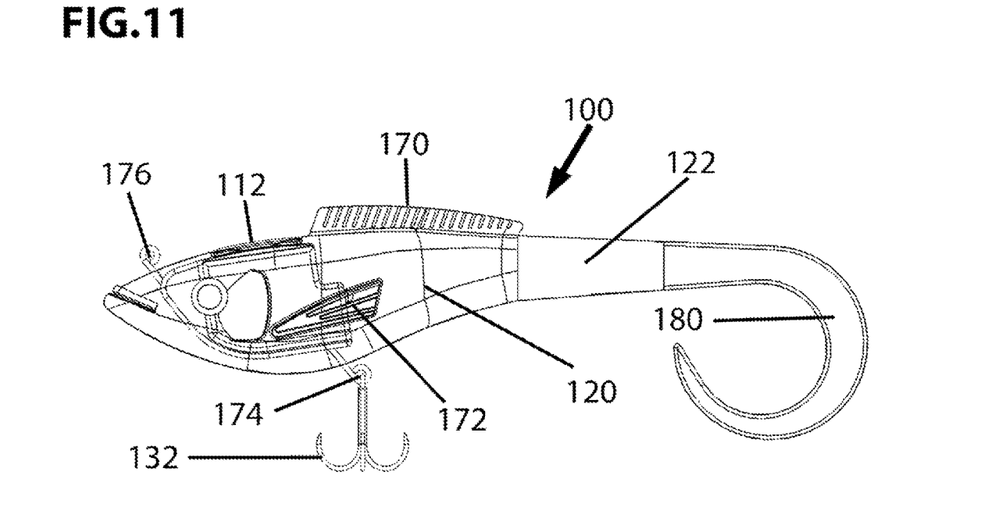
FIG. 11 is a vertical side view of the polymer light transition medium swimbait with the lenticular lens and illumination system.
Figure 12:
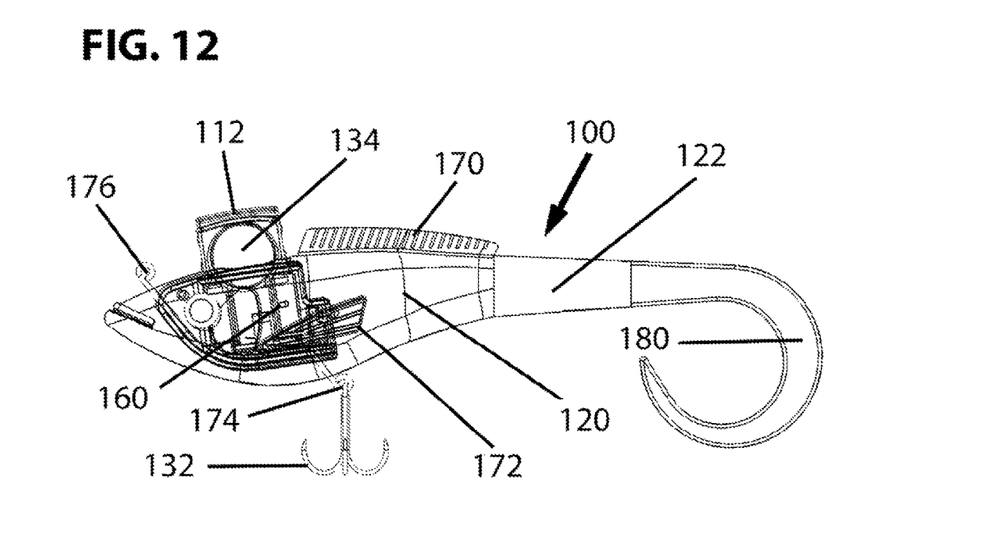
FIG. 12 is a transparent view of FIG. 11.

FIG. 11-12 shows a solid and transparent side view of fishing lure 100, a swimbait made of polymer light transmission medium 122 having similar components depicted in FIGS. 1-2 but including dorsal fin 170 and pectoral fin 172 which become luminescent once LED 160 is activated. Tail 180 flutters when retrieved as lenticular lens 120 mimics the color pattern, motion and appearance of the swimbait fish. Treble hook 132 is connected to treble hook eyelet 174 and fishing line is connected to fishing line connecting eyelet 176 allowing equal energy to be directed between treble hook and fishing line when a fish strikes and interaction occurs to the swimbait lure.

Figure 13:
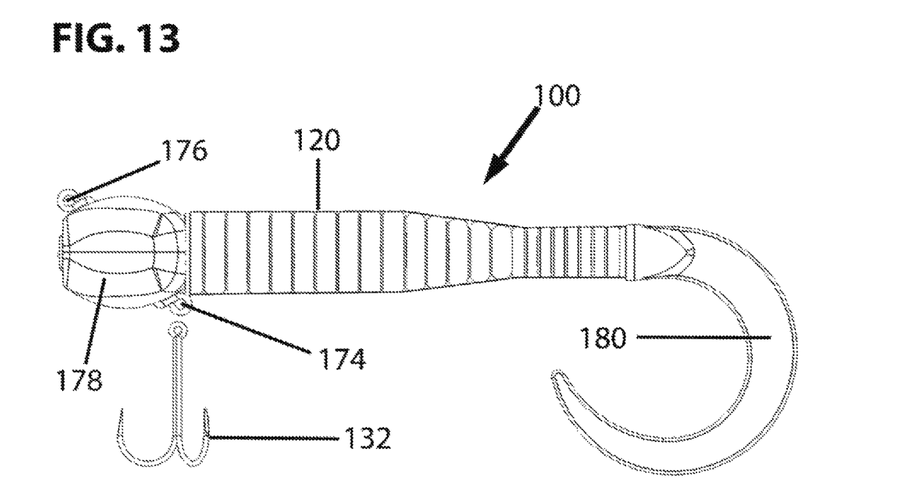
FIG. 13 is a vertical side view of the polymer light transition medium jig lure with the lenticular lens and illumination system.
Figure 14:
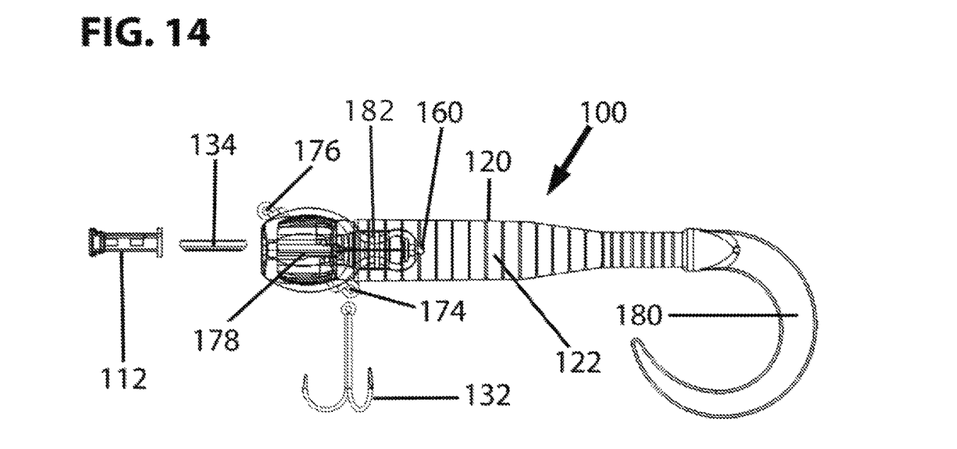
FIG. 14 is a transparent view of FIG. 13.

FIG. 13-14 shows a solid and transparent side view of fishing lure 100, a jig lure made of polymer light transmission medium 122 having similar components depicted in FIGS. 1-2 and FIGS. 11-12 but including a removable polycarbonate or polymer jig head housing 178 which contains LED 160, battery cell boot 112 and power source 134. The removable jig head housing 178 allows other style jig body baits to be removed and replaced by pulling out pressure retention jig head connecting adapter 182 and pushing on new jig bodies. Lenticular lens 120 attached at the flat back translucent surface to polymer light transmission medium 122 mimics each jig body while maintaining a color pattern, iridescence, flash, motion effect and two or three dimensional appearance to the jig lure. Jigs which are fished at greater depths will catch more fish with the combination of the polymer light transmission medium body 122 and lenticular lens 120 as the LED 160 will not be seen only the appearance of the jigs interlaced image appearing similar to its surface counterpart.

Figure 15:
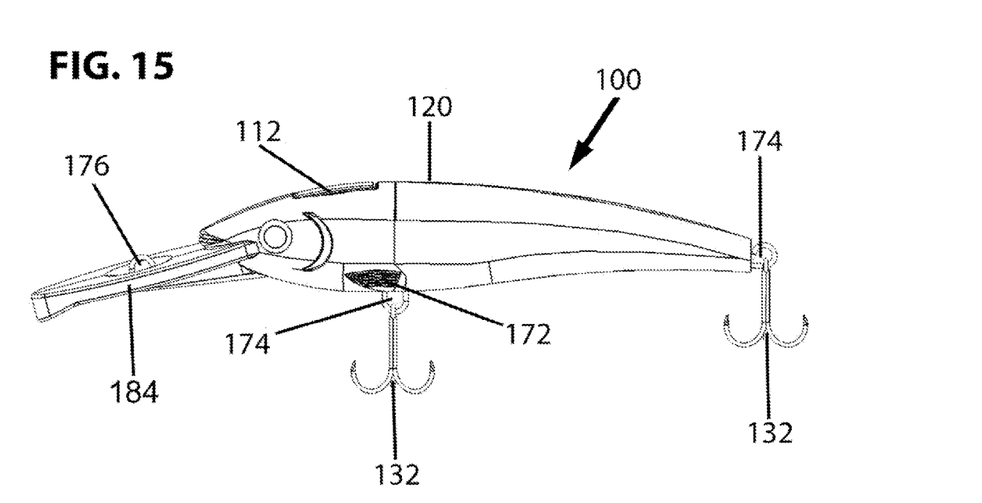
FIG. 15 is a vertical side view of the polymer light transition medium hard bodied lure with the lenticular lens and illumination system.
Figure 16:
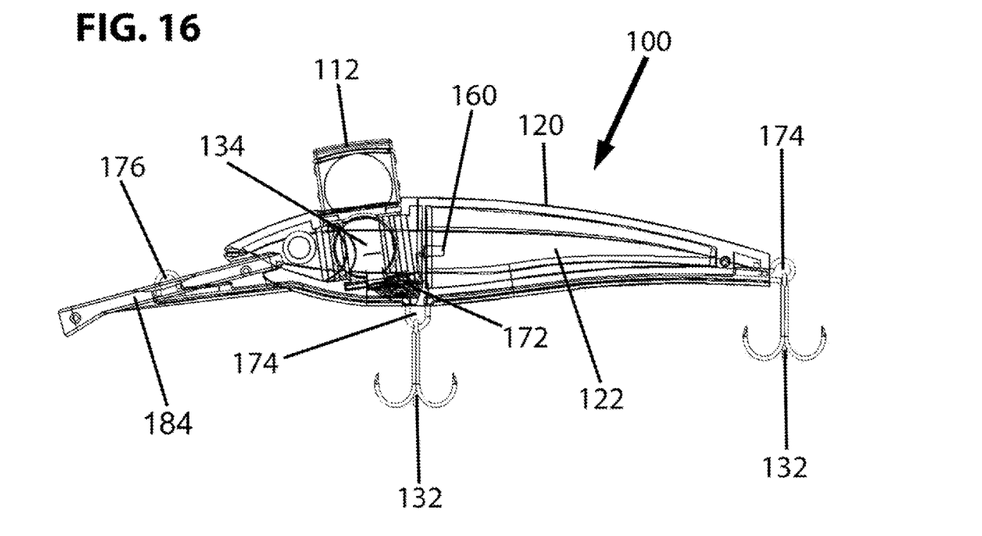
FIG. 16 is a transparent view of FIG. 15

FIG. 15-16 shows a solid and transparent side view of fishing lure 100, a hard bodied lure made of polycarbonate or acceptable materials having similar components depicted in FIGS. 1-2 and FIGS. 11-12 but including hard bodied lure bill 184 which directs the lure to a pre determined water depth when retrieved. The polymer light transmission medium 122 can be located within the lure body with the lenticular lens 120 placed on or adjacent to the polymer light transmission medium or located on the outside of the lure body adjacent to the polymer light transmission medium.

Figure 17:
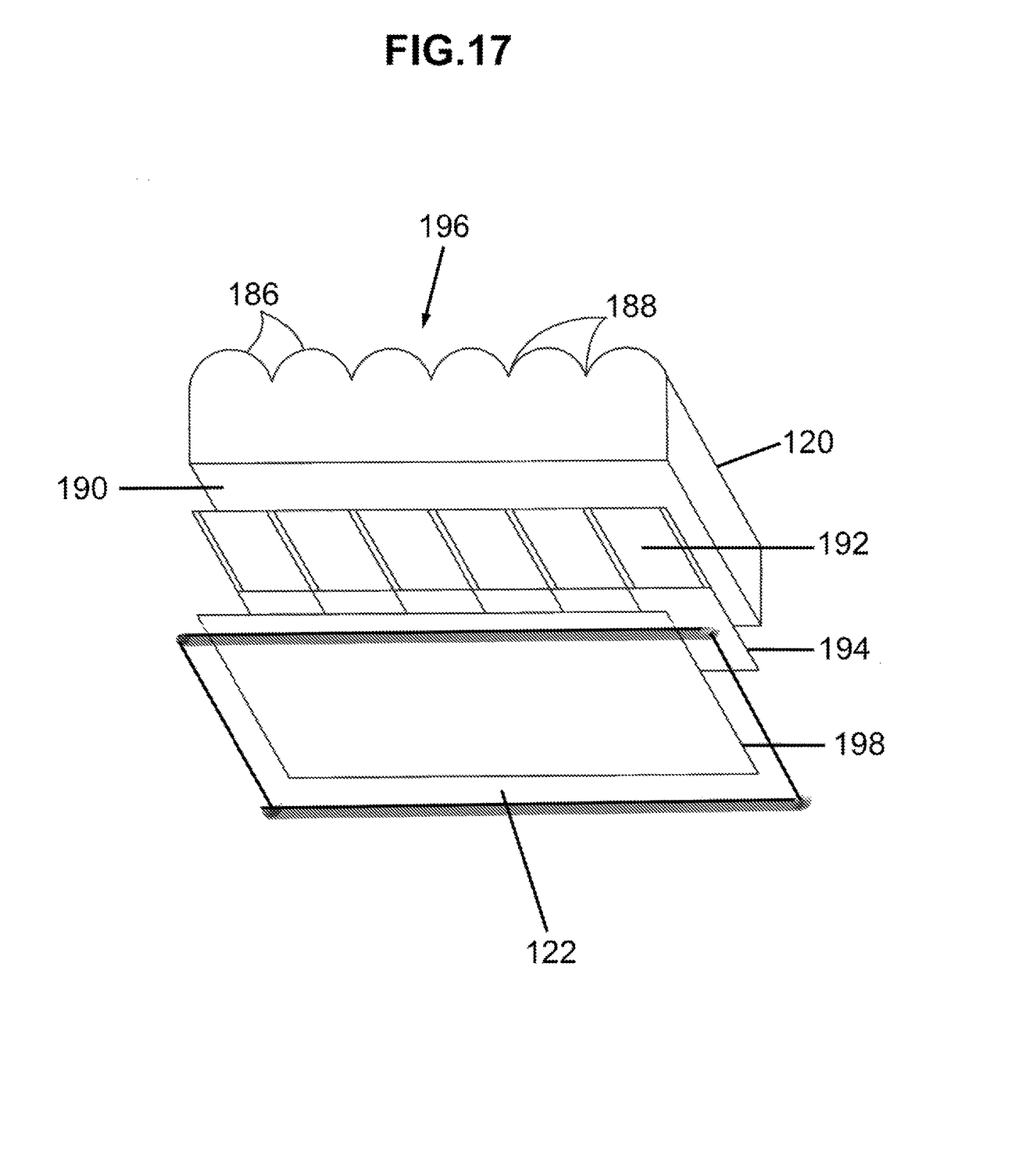
FIG. 17 is a front angled view of the lenticular lens combined with the polymer light transmission medium.

FIG. 17 shows a schematic representation of the lenticular lens 120 having a planar back surface 190 and a front surface 196 comprised of equally spaced parallel lenticular lines 188 which define lenticules 186 through which an interlaced image 194 can be viewed. Each interlaced segment 192 is arranged in the desired order covered by one lenticule and forms the lenticular interlaced image 194 designed for each bait fish image for the spoon, swimbait, jig and hard bodied lure. The flat back translucent surface 198 is permanently attached to the designed interlaced image 194 allowing illumination to be projected outwardly from the combination of the polymer light transmission medium 122.

The polymer light transmission medium described and depicted herein can be made from various polymer light transmitting mediums having any number of optical attributes including but not limited to an acceptable refractive index for interacting and/or interfacing with the light source and/or transmitting or otherwise propagating light emitted by one or more light sources. Depending on the specific illuminating attributes utilized in any given embodiment, the polymer light transmitting mediums can interact and/or interface with the light sources as well as with the ambient light in the water, if any, to create a particularized illumination inside and/or in close proximity to the spoon, swimbait, jig and hard bodied fishing lure body. Further, certain polymer light transmitting mediums may include one or more additional optical attributes such as, but not limited to: (1) luminescence, whereby the polymer light transmitting mediums interact with the light sources to produce a light wavelength having a soft glow of a desired intensity and/or dispersion; (2) iridescence, whereby the polymer light transmitting mediums interact with and/or otherwise split light emitted by the light sources to produce a spectrum of light with more than one wavelength; for example, but not limited to, one having a rainbow like refraction pattern; (3) fluorescence, whereby the polymer light transmitting mediums interact with the light sources to produce a light wavelength having a bright radiant glow; and (4) reflectivity, whereby the polymer light transmitting mediums reflect light at one or more wavelengths produced by the light sources without altering the wavelength of the light. Other optical properties may also be provided in the polymer light transmitting mediums. Such properties may operate upon, influence, distort or otherwise alter the phase, amplitude, wavelength and/or other properties of one or more beams of light.

More particularly, the light source can be embedded in or located proximate to the polymer light transmission medium in order to amplify, intensify, and/or disperse light in a diffused manner along the polymer light transmission medium to provide and maintain a color, color pattern, flash and iridescence to the spoon, swimbait, jig or hard bodied fishing lure as well as transmit light through the lenticular lens as described above in greater detail to create a motion effect and a two or three dimensional appearances to the spoon, swimbait, jig or hard bodied fishing lure.

Various arrangements and embodiments concerning an illumination system for a spoon, swimbait, jig and hard bodied fishing lure have been described which may include a power source, a light source, a polymer light transmission medium and lenticular lens. It will also be appreciated that the features described in connection with each arrangement and embodiment are interchangeable so that many variations beyond those specifically described are possible. Therefore, although various representative embodiments have been described above with a certain degree of particularity, those skilled in the art could make numerous alterations to the disclosed embodiments without departing from the spirit or scope of the inventive subject matter set forth in the specification and claims.

All directional references (e.g., upper, lower, upward, downward, left, right, back, front, isometric, exploded, leftward, rightward, top, bottom, above, below, vertical, and horizontal) are only used for identification purposes to aid the reader's understanding of the embodiments, and do not create limitations, particularly as to the position, orientation, or use of the spoon, swimbait, jig, and hard bodied fishing lures unless specifically set forth in the claims. Joinder references (e.g., attached, embedded, coupled, adjacent, connected, and the like) are to be construed broadly and may include intermediate members between a connection of elements and relative movement between elements. As such, joinder references do not necessarily infer that two elements are directly connected and in fixed relation to each other.

In some instances, components are described with reference to "adjacent" having a particular characteristic and/or being connected with another part. However, those skilled in the art will recognize that the present invention is not limited to components which terminate immediately beyond their points of connection with other parts. Thus, the term "adjacent" should be interpreted broadly, in a manner that includes areas rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A fishing lure comprising:
a singular, one piece lenticular lens having a lenticular front surface, lenticular layers and a flat back translucent surface, the lenticular lens configured to receive light from a light source from the flat back translucent surface and project an image outwardly through the lenticular layers;
the light source optically coupled to a polymer light transmission medium;
a lure body comprising the polymer light transmission medium attached to or in close proximity to the flat back translucent surface of the lenticular lens;
a power source electrically coupled to the light source;
an eyelet through which fishing line attaches to the fishing lure and which is connected to the lure body; and
a fishing hook coupled to the lure body.

2. The fishing lure of claim 1 wherein the light source comprises a light emitting diode.

3. The fishing lure of claim 1 wherein the power source comprises a battery positioned in a water tight compartment.

4. The fishing lure of claim 1 wherein the polymer light transmission medium comprising the lure body is embedded with reflective materials.

5. The fishing lure of claim 1 wherein the lure body is configured to be a spoon lure.

6. A fishing lure comprising:
a singular, one piece lenticular lens having a lenticular front surface and a back translucent surface, the lenticular lens configured to receive light from a light source from the back translucent surface and project an image outwardly through lenticular layers of the lenticular lens;
the light source optically coupled to a polymer light transmission medium;
a lure body comprising the polymer light transmission medium attached to or in close proximity to the back translucent surface of the lenticular lens;
a power source electrically coupled to the light source;
the lure body further configured to contain the lenticular lens, the light source and the power source;
an eyelet through which fishing line attaches to the fishing lure and which is connected to the lure body; and
a fishing hook coupled to the lure body.

7. The fishing lure of claim 6 wherein the light source comprises a light emitting diode.

8. The fishing lure of claim 6 wherein the power source comprises a battery positioned in a water tight compartment.

9. The fishing lure of claim 6 wherein the polymer light transmission medium comprising the lure body is embedded with reflective materials.

10. The fishing lure of claim 6 wherein the lure body is comprised of a hard bodied lure and the lenticular lens is positioned on an outside surface of the hard bodied lure.

11. A fishing lure comprising:
a singular, one piece lenticular lens having a lenticular front surface and a back translucent surface, the lenticular lens configured to receive light from a light source from the back translucent surface and project an image outwardly through lenticular layers of the lenticular lens;

the light source optically coupled to a polymer light transmission medium;

a lure body comprising the polymer light transmission medium attached to or placed in close proximity to the back translucent surface of the lenticular lens;

a power source electrically coupled to the light source;

the lure body further configured to contain the lenticular lens, the light source and the power source;

the lure body further comprising an exterior surface feature resembling luminescent fish scales or fins through which light from the lenticular lens or polymer light transmission medium is further refracted;

an eyelet through which fishing line attaches to the fishing lure and which is connected to the lure body; and a fishing hook coupled to the lure body.

12. The fishing lure of claim 11 wherein the light source comprises a light emitting diode.

13. The fishing lure of claim 11 wherein the power source comprises a battery positioned in a water tight compartment.

14. The fishing lure of claim 11 wherein the polymer light transmission medium comprising the lure body is embedded with reflective materials.

15. The fishing lure of claim 11 wherein the lure body is configured to be a spoon lure.

* * * * *